United States Patent
Mudler et al.

(10) Patent No.: US 9,922,308 B2
(45) Date of Patent: *Mar. 20, 2018

(54) EMPLOYEE MANAGEMENT

(71) Applicant: AUTHORIA, INC., Waltham, MA (US)

(72) Inventors: Michelle Mudler, Laveen, AZ (US); Michael Galyen, Austin, TX (US); Tobias Hauner, Brookline, MA (US); Mark Munzer, Westwood, MA (US)

(73) Assignee: Peoplefluent, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/259,471

(22) Filed: Apr. 23, 2014

(65) Prior Publication Data

US 2014/0236849 A1    Aug. 21, 2014

Related U.S. Application Data

(63) Continuation of application No. 11/541,930, filed on Oct. 2, 2006, now abandoned.

(51) Int. Cl.
*G06Q 10/10* (2012.01)
*G06Q 10/06* (2012.01)

(52) U.S. Cl.
CPC .......... *G06Q 10/105* (2013.01); *G06Q 10/06* (2013.01); *G06Q 10/10* (2013.01)

(58) Field of Classification Search
CPC ......... G06Q 10/00; G06Q 40/00; G06F 17/60
USPC ........................................ 705/7.11
See application file for complete search history.

(56) References Cited

U.S. PATENT DOCUMENTS

| 5,829,003 | A | 10/1998 | Okura | |
|---|---|---|---|---|
| 6,049,776 | A | 4/2000 | Donnelly et al. | |
| 6,370,510 | B1 | 4/2002 | McGovern et al. | |
| 6,604,080 | B1 * | 8/2003 | Kern | G06Q 10/10 705/4 |
| 7,013,299 | B1 | 3/2006 | Sherwood | |
| 7,103,562 | B2 | 9/2006 | Kosiba et al. | |
| 7,526,510 | B2 | 4/2009 | Sherwood | |
| 7,555,441 | B2 | 6/2009 | Crow et al. | |
| 7,769,618 | B2 * | 8/2010 | Levanon | 705/7.22 |
| 7,818,197 | B2 * | 10/2010 | Cho et al. | 705/7.21 |
| 7,870,012 | B2 * | 1/2011 | Katz et al. | 705/7.26 |

(Continued)

FOREIGN PATENT DOCUMENTS

| CA | 2405020 A1 | 10/2001 |
|---|---|---|
| CA | 2664905 | 9/2007 |

(Continued)

OTHER PUBLICATIONS

Non-final office action dated Jan. 20, 2015 in U.S. Appl. No. 11/541,930, 5 pages.

(Continued)

*Primary Examiner* — Romain Jeanty
(74) *Attorney, Agent, or Firm* — Fish & Richardson P.C.

(57) ABSTRACT

Among other things, at least part of an organizational chart of an enterprise is displayed to a manager, the displayed organizational chart including employee positions and their relationships, and elements are displayed on the displayed organizational chart that can be invoked by the manager to perform actions with respect to the employee positions.

44 Claims, 21 Drawing Sheets

(56) References Cited

U.S. PATENT DOCUMENTS

Figure 1:
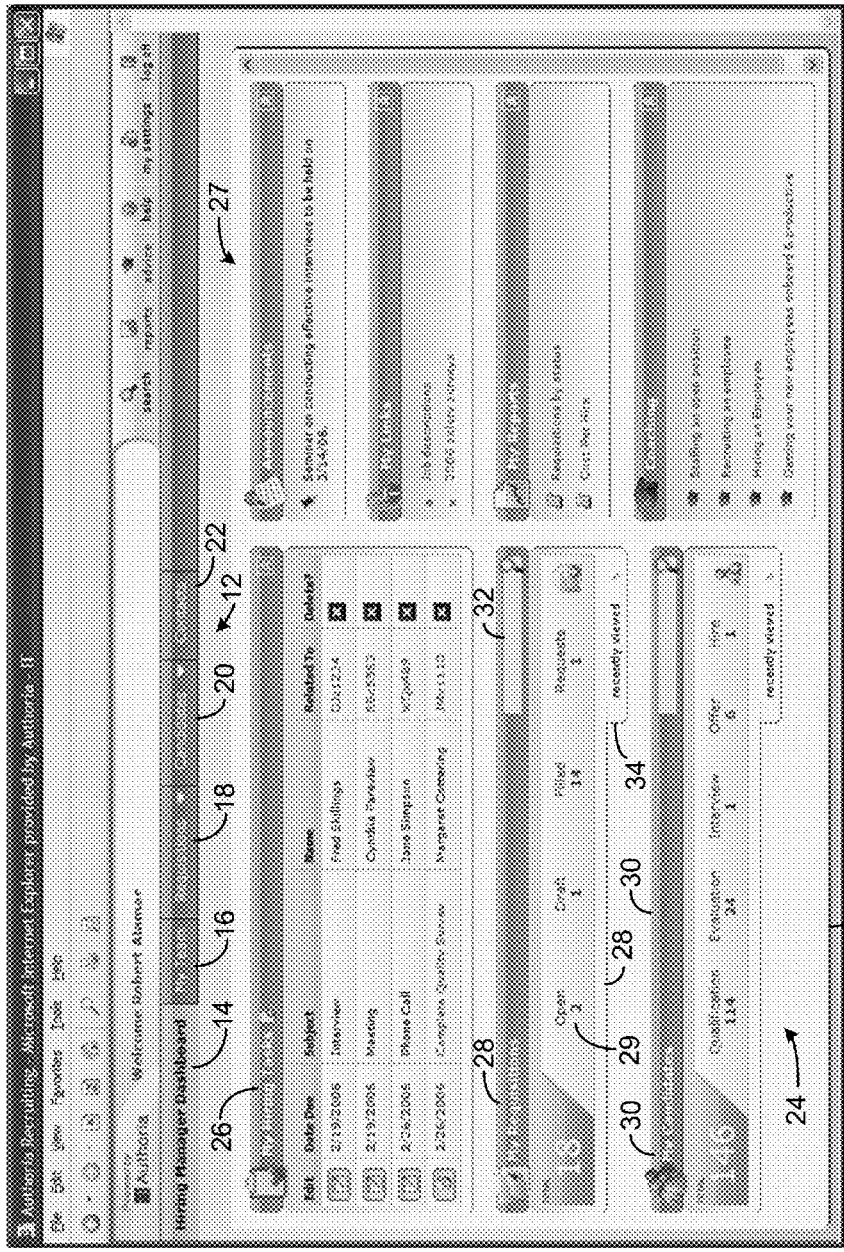

| | | | |
|---|---|---|---|
| 7,912,790 | B2 | 3/2011 | Albertsson |
| 7,945,522 | B2 | 5/2011 | McGovern et al. |
| 8,090,621 | B1 * | 1/2012 | Chakrabarti et al. ........ 705/26.1 |
| 2002/0111887 | A1 | 8/2002 | McFarlane et al. |
| 2003/0191751 | A1 | 10/2003 | Vora et al. |
| 2004/0030566 | A1 | 2/2004 | Brooks Rix |
| 2004/0215475 | A1 | 10/2004 | Maglaris et al. |
| 2004/0267595 | A1 | 12/2004 | Woodings et al. |
| 2006/0031115 | A1 | 2/2006 | Eisma et al. |
| 2006/0178919 | A1 | 8/2006 | Warncke |
| 2006/0218394 | A1 | 9/2006 | Yang |
| 2008/0091441 | A1 | 4/2008 | Flammer et al. |
| 2008/0104531 | A1 | 5/2008 | Stambaugh |
| 2008/0235073 | A1 | 9/2008 | Cavander et al. |
| 2009/0257376 | A1 | 10/2009 | Dhanapal et al. |
| 2010/0217652 | A1 | 8/2010 | Brooks Rix |
| 2010/0241507 | A1 | 9/2010 | Quinn |
| 2011/0196801 | A1 | 8/2011 | Ellis et al. |
| 2011/0271220 | A1 | 11/2011 | Remsberg et al. |
| 2012/0036455 | A1 | 2/2012 | Holt |
| 2012/0130869 | A1 | 5/2012 | Shergill et al. |
| 2013/0159203 | A1 | 6/2013 | Munzer |

FOREIGN PATENT DOCUMENTS

| | | |
|---|---|---|
| EP | 2078250 | 7/2009 |
| HK | 1136050 A | 6/2010 |
| WO | 2008/042677 A2 | 4/2008 |
| WO | 2010/138728 A2 | 12/2010 |
| WO | 2013-191709 A2 | 12/2013 |

OTHER PUBLICATIONS

Office Action and Examination Search Report dated Sep. 19, 2016 in corresponding Canadian Application No. 2,664,905, 5 pages.
Final Office Action dated Jul. 30, 2015 from related U.S. Appl. No. 11/541,930, 13 pages.
Office Action dated Sep. 29, 2014 in corresponding Canadian Application No. 2,664,905, 6 pages.
Non-final office action dated Sep. 24, 2014 in U.S. Appl. No. 11/541,930, 11 pages.
Non-final office action dated Sep. 15, 2014 in U.S. Appl. No. 13/531,520, 20 pages.
International Search Report dated Mar. 13, 2008 in corresponding International Application No. PCT/US07/79615, 7 pages.
Non-final Office Action dated Oct. 29, 2009 in U.S. Appl. No. 11/541,930, 9 pages.
Final Office Action dated Jul. 12, 2010 in U.S. Appl. No. 11/541,930, 10 pages.
Notice of Allowance dated Feb. 28, 2014 in U.S. Appl. No. 11/541,930, 8 pages.
Final Office Action dated Jan. 14, 2014 in U.S. Appl. No. 13/531,520, 22 pages.
Non-final Office Action dated May 17, 2013 in U.S. Appl. No. 11/541,930, 18 pages.
International Search Report dated Sep. 19, 2012 in corresponding International Application No. PCT/US12/43907, 1 page.
Communication pursuant to Article 94(3) in EP Application No. 07 853 646.3, dated Sep. 30, 2011, 6 pages.

* cited by examiner

EMPLOYEE MANAGEMENT

CROSS-REFERENCE TO RELATED APPLICATIONS

This application is a continuation application of and claims priority to U.S. application Ser. No. 11/541,930, filed on Oct. 2, 2006, the entire contents of which are incorporated herein by reference.

BACKGROUND

This description relates to employee management.

A person who manages other people in a business, for example, is typically charged with a variety of human resource tasks. These may include performance reviews, goals setting, salary and bonus allocations, filling open positions, training assignments, and succession planning, for the people who are positioned below the manager in the organizational chart of the business. To perform one or more of these tasks, the manager may invoke software processes of a software application running on his workstation. The software application may also enable the manager to view the organizational chart in various display styles.

SUMMARY

In general, in an aspect, at least part of an organizational chart of an enterprise is displayed to a manager, the displayed organizational chart including employee positions and their relationships, and elements are displayed on the displayed organizational chart that can be invoked by the manager to perform actions with respect to the employee positions.

Implementations may include one or more of the following features. Displaying at least part of an organizational chart includes displaying information about the status of at least one of the positions. The status includes displaying at least one of: planned but not authorized, authorized but not filled, and filled. The actions include viewing information about the position. The actions include at least one of planning a position, budgeting for a position, requisitioning a person for a position, and reviewing candidates for a position. Displaying at least part of an organizational chart includes displaying information about a particular person who occupies one of the positions. Displaying the elements that can be invoked includes displaying the elements visually in association with employee positions to which they relate. The displaying of at least part of an organizational chart and the displaying of elements are determined based on a role being played by the manager. The manager is enabled to control a style in which the organizational chart is displayed, including a chart style, and a tree style. A control element is displayed that enables the manager to toggle between displaying information about a position and information about actions that can be taken to change a status of the position.

In general, in an aspect, a user interface paradigm includes a display to a manager of at least part of an organizational chart of an enterprise, the displayed organizational chart including employee positions and their relationships, and a display to the manager of elements on the displayed organizational chart that can be invoked by the manager to perform actions with respect to the employee positions.

Other aspects of the invention may include other combinations of one or more of the aspects and features recited above and other aspects and features, expressed as methods, apparatus, systems, and program products, and in other ways, as will become apparent from the following description and from the claims.

DESCRIPTION

FIGS. 1 through 16 and 18 through 21 are screen shots. FIG. 17 is a block diagram.

As shown in FIG. 1, a portal page 10 of a user interface to a software application for a manager offers manager navigation buttons 12 that are selected to enable him to see information and perform functions that relate to a role that he performs in the enterprise. In the example, shown in FIG. 1, the portal page is for the role of a hiring manager, Robert Alamar, the director of finance. The functions and views offered by the buttons include a dashboard 14, a view of the manager's team 16, a way to requisition new people 18, a view of information about candidates 20, and a general contacts function 22. The buttons (and hence the subsequent views that can be invoked by the manager) can be selected based on functions and tasks that are available from the underlying software application, on choices made by the manager to configure his interface, and in other ways.

The dashboard view 24 provides panes that display to the manager information about (and enable him to perform) hiring tasks to be done 26, requisitions 28, candidates 30, and others 27. The requisitions and candidates panes display top level numerical status information 29 about the numbers of requisitions and candidates that have certain respective statuses, for example, of 146 candidates under consideration, 24 have evaluations pending, one has an interview pending, and six have offers pending. Each task pane 28, 30 includes a box 32 in which a query can be entered to locate requisitions or candidates and a link 34 to display recently viewed records.

The particular panes that are displayed on the dashboard view will depend on the information needed and tasks to be done for the role played by the manager to whom they are presented, in this case the role of the manager being as a hiring manager. As will be seen later, Robert Alamar is the director of finance of the enterprise. In that position, he could have a variety of different roles. The particular role for which the dashboard view of FIG. 1 applies is as a person who hires people for his group.

The particular panes that are displayed also depend on the available information and functions provided by the software application that underlies the dashboard view. In addition, among a larger set of available panes, the manager who uses the dashboard can control the selection of panes to be displayed, and their layout and style.

Figure 2:
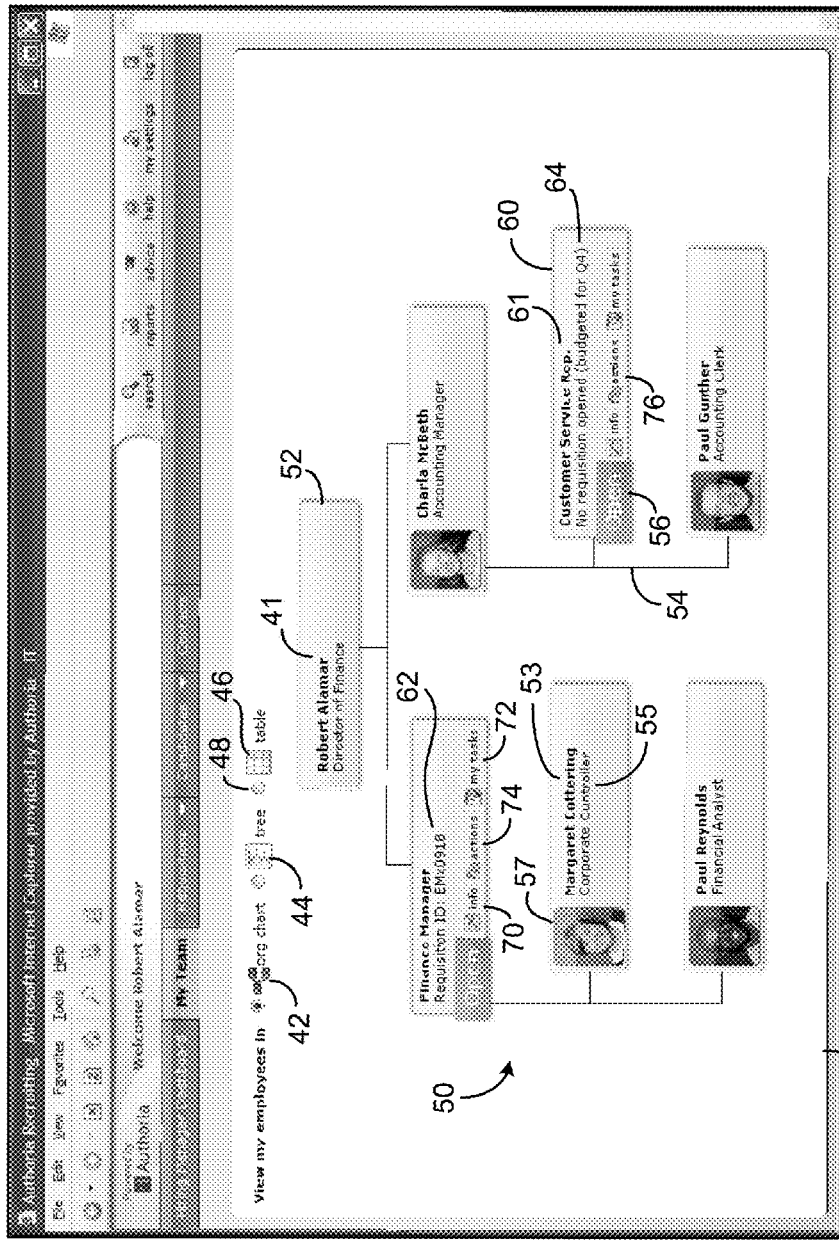

When the team button 16 is invoked by the manager, a team window 40 is displayed as shown in FIG. 2. The team window displays to the manager information about a set of employee positions of the enterprise, in this case including the position (Director of Finance) of the manager himself 41 and of the positions of the people who are situated below him on the organizational chart of the finance department.

In the team window, icons 42, 44, and 46 and associated radio buttons 48 enable the manager to choose the graphical organization of the view of his team, either as an organizational chart 50, a tree, or a table.

As shown in FIG. 2, the organizational chart 50 is displayed as a hierarchically arranged set of panels 52, each panel related to one employee. In some examples (not shown), a panel would relate to a group of positions of people who work under a manager and that group panel could be toggled to roll down and roll up hidden parts of the organizational chart under that group panel. Connecting lines 54 on the organizational chart 50 indicate reporting relationships among employees in the typical way.

The organizational chart represents the positions and their relationships in the enterprise hierarchy. The status of a position may change over time. The position may be, for example, planned but not yet budgeted, budgeted but not yet filled (open), or filled. When a position is filled, the panel 52 may show the name 53, title 55, and photograph 57 of the employee who occupies the existing position on the chart.

In some cases, if the existing position is not filled, the panel 60 is displayed in a different color and indicated by an Open flag 56. An unfilled position panel shows the position title 61 and either a requisition 62 that has been opened or an indication 64 that no requisition has been authorized, but the position has been budgeted. Alternatively, for example, the position could be shown as planned but not yet opened.

In general, the organizational charts of the kind described here are active charts that enable the manager to do more than merely look at different portions of an organizational structure to see the positions in the structure and who occupies the positions. The organizational charts described here also enable the manager to perform personnel management tasks associated with one or more of the positions or of people who occupy them by directly invoking links that are graphically associated with the people or positions. Invoking the links leads directly to activities or information useful in the manager's role or roles.

Because the organizational chart is active, it can effectively serve as a user interface paradigm much as the Microsoft Windows desktop paradigm serves as a general interface to applications managed by the operating system. In the organizational chart paradigm, the manager can rely almost entirely on the window that displays the organizational chart as a mode of using the processes of the software application. The user is able to align his understanding of the structure of the organization that he manages directly with the functions that he may need to perform and the information that he may need to obtain with respect to positions in that organization, rather than needing to learn a set of interfaces that are directed to the functions while using the organizational chart only occasionally as a passive chart.

For example, as shown in FIG. 2, the manager can take actions with respect to unfilled positions in the organizational structure. In addition to obtaining additional information by invoking a link 70 titled info and navigating to the list of tasks (similar to the list shown in pane 26 of FIG. 1) using the link labeled my tasks 72, the manager can click on the actions links 74 or 76.

Figure 3:
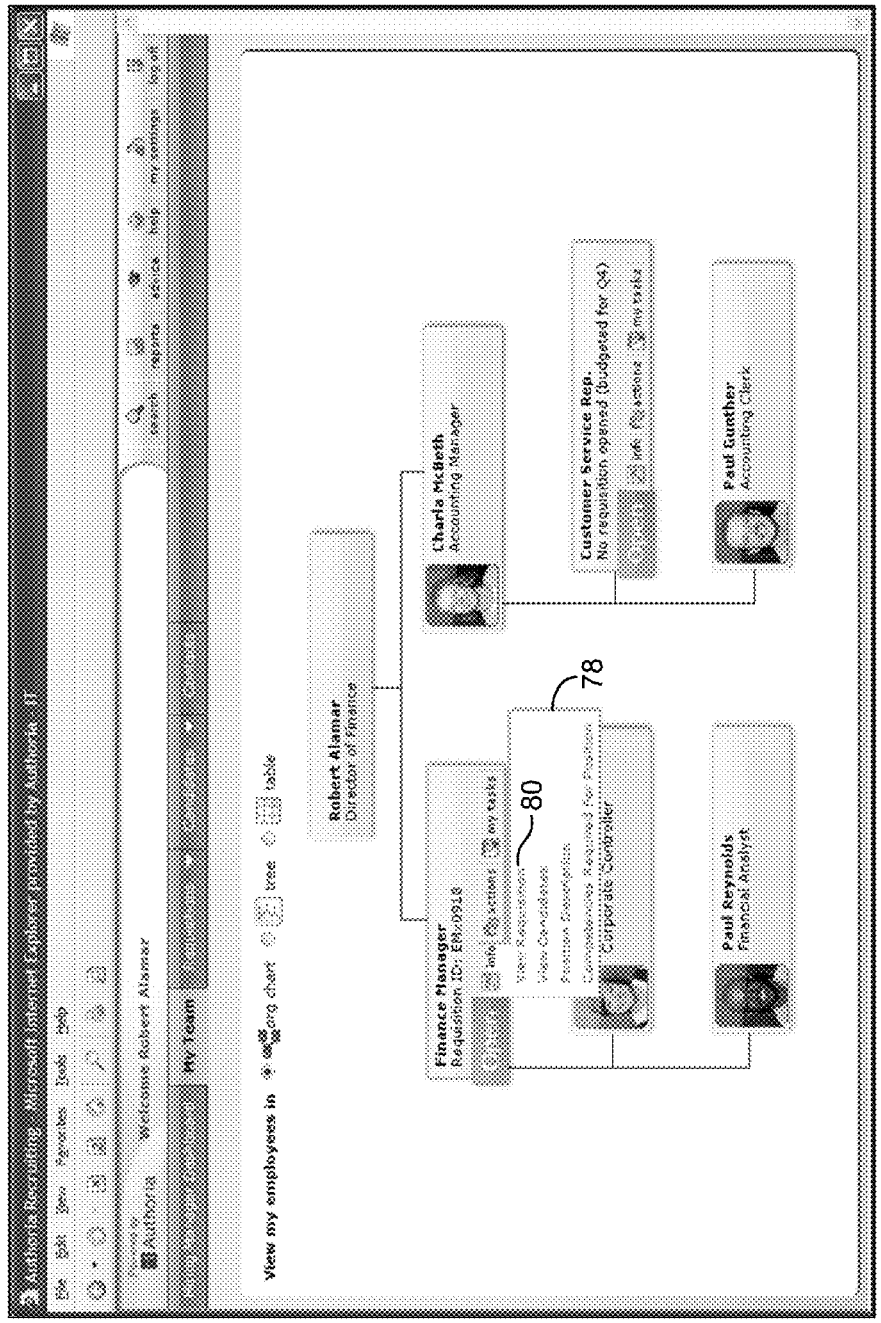
Figure 18:
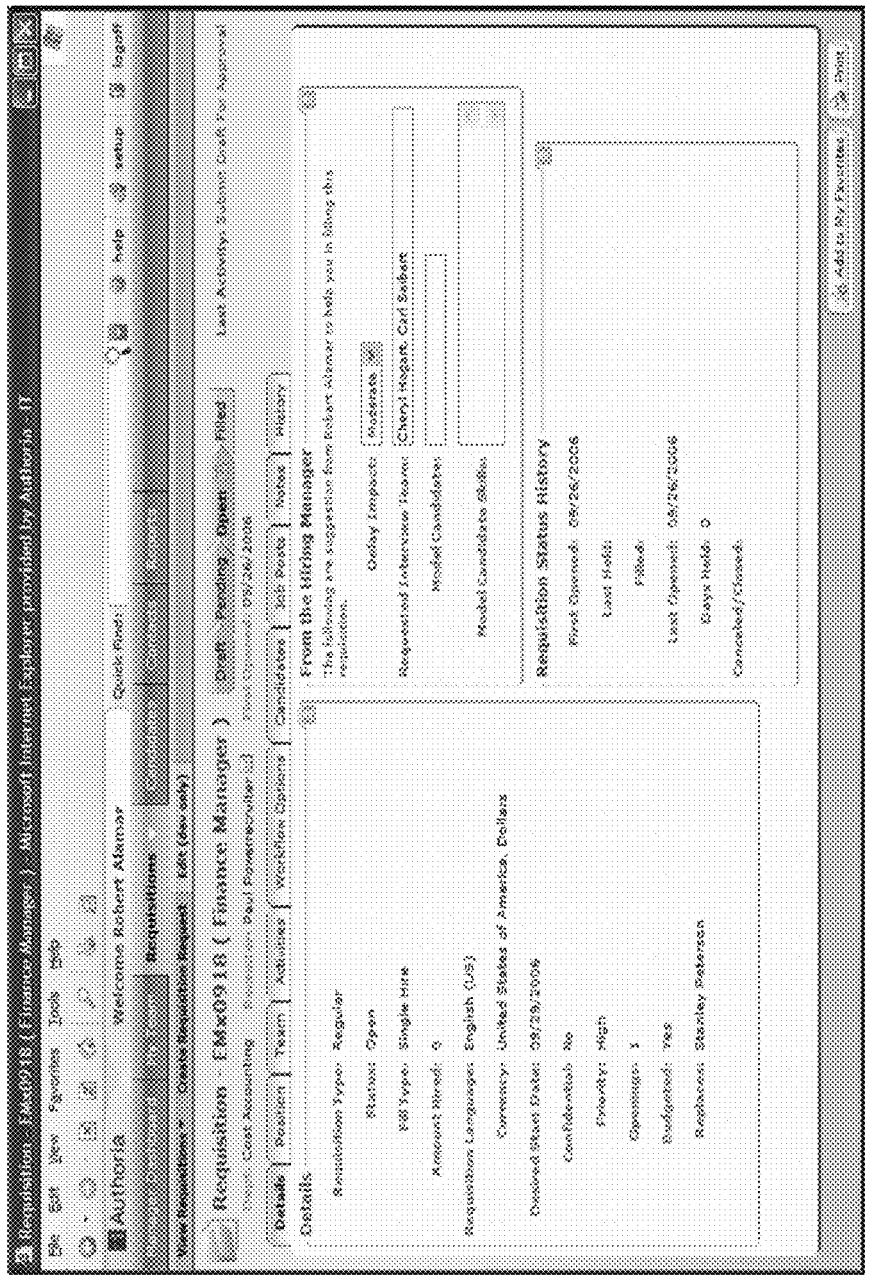
Figure 21:
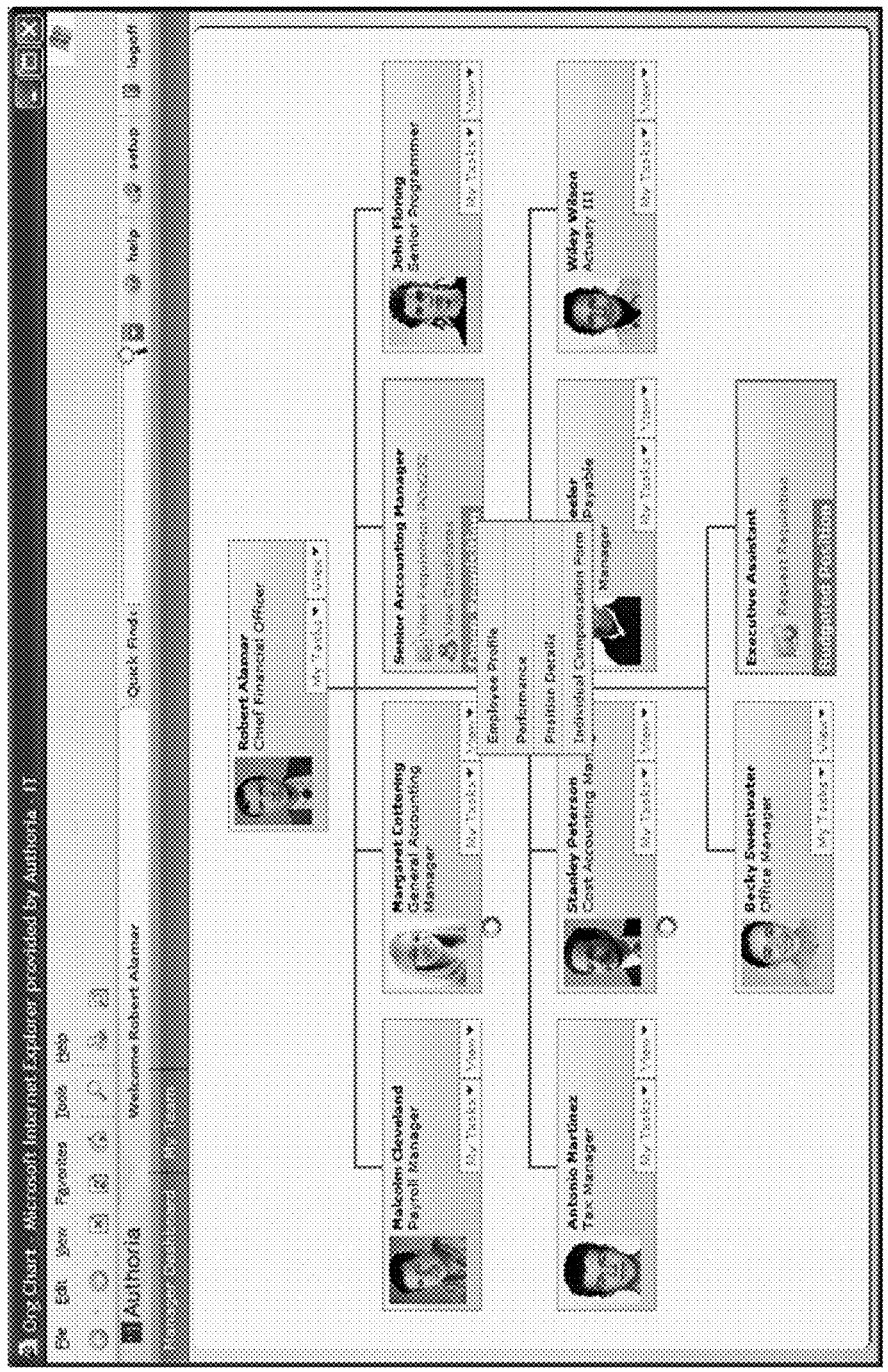

When an info link is invoked, a list 78 (as shown in FIG. 3) drops down to identify categories 80 of information available to the manager in the context of the role that is represented by the interface at the current time. Other examples of information that may be available include salary and performance information as shown in FIG. 21. The categories of information depend both on the manager's role for which the interface is configured and on the available information in the underlying database. If the manager invokes one of the categories on the list, that information is displayed on the screen. For example, if the View Requisition entry were invoked, the requisition associated with the position would be displayed as shown in FIG. 18.

Figure 4:
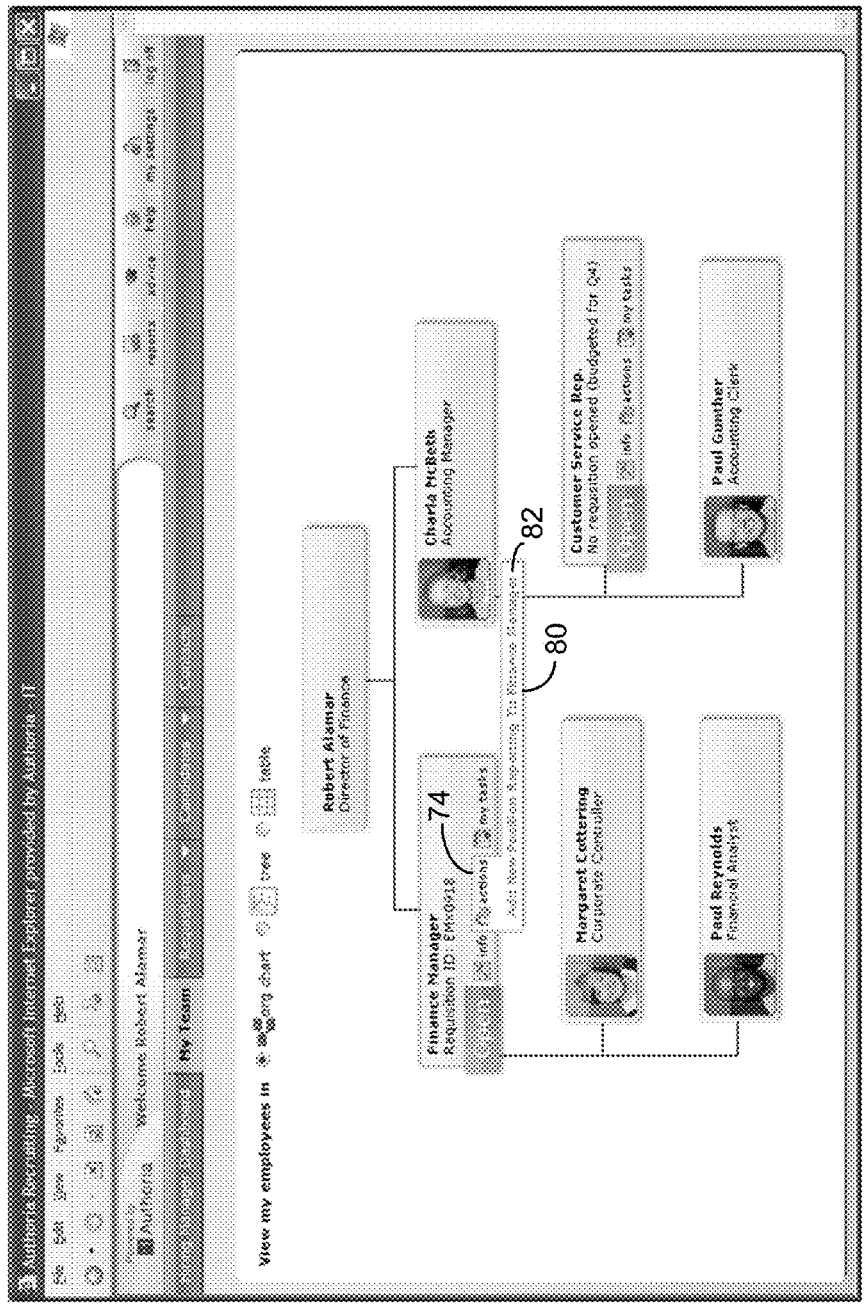

As shown in FIG. 4, when the actions link 74 is invoked, a drop down list 80 identifies actions that may be taken by invoking an entry 82 on the drop down list. The selection of available actions depends, as in FIG. 3, not only on the actions that are available from the software application but also on the context of the manager's role that is active in the interface.

Figure 19:
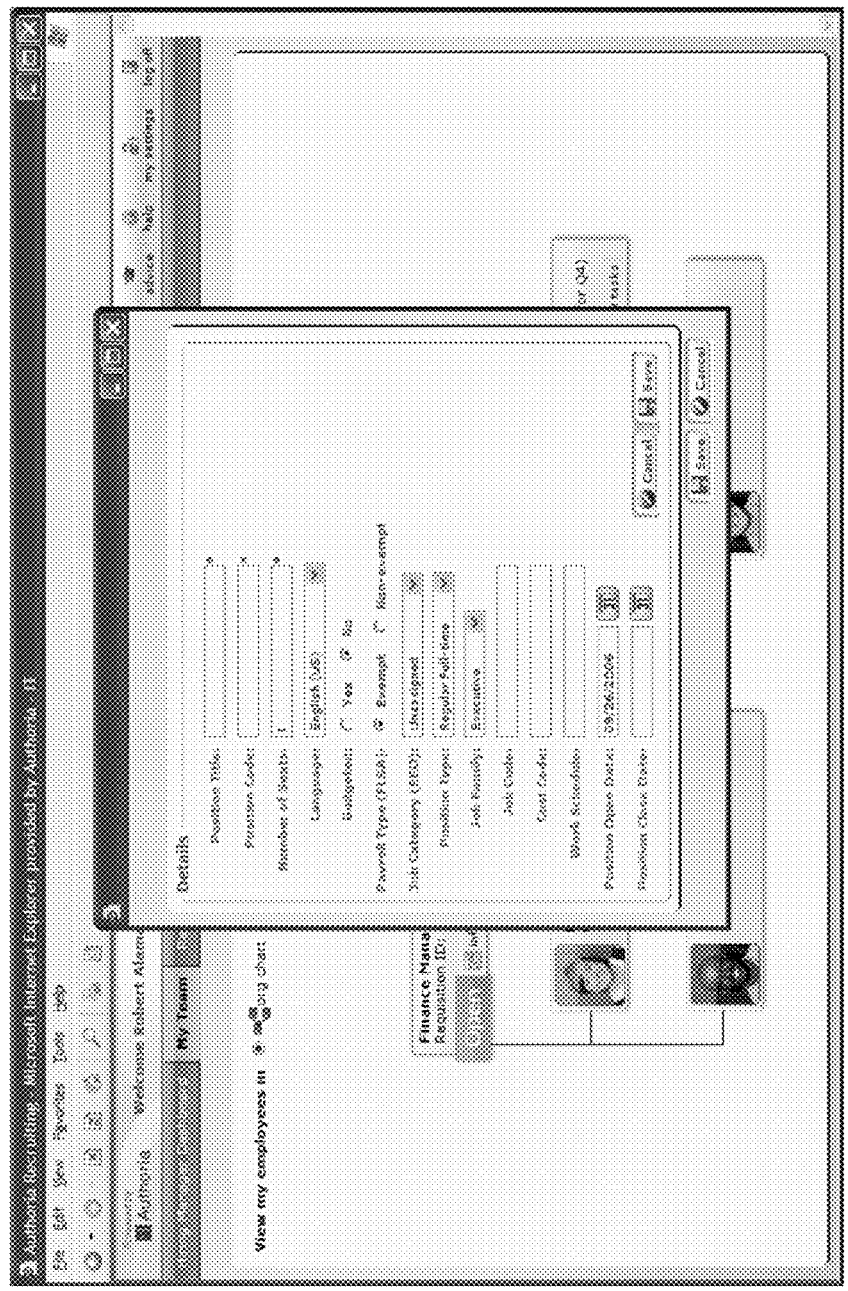

In the example shown, by invoking the Add New Position Reporting to Finance Manager item, the manager is taken to a process in the application that enables a new position to be added to the organizational chart as shown in FIG. 19. In general, whenever an invocation by the manager of a link that leads to windows in which information is presented or the features of a process of the software application can be used, the interface automatically (or by invocation of a link by the manager) returns to the organizational chart paradigm when the manager is finished using the information or working with the features.

Enabling the manager to build and manage the organizational chart directly in this way, and to navigate back and forth from the organizational chart paradigm to other informational and action screens, emphasizes to the manager the paradigmatic nature of the interface. That is, he can not only use the organizational chart interface for navigation through the functional features of the application, but he also can create and manage the structure, positions, and people of the chart itself.

Figure 5:
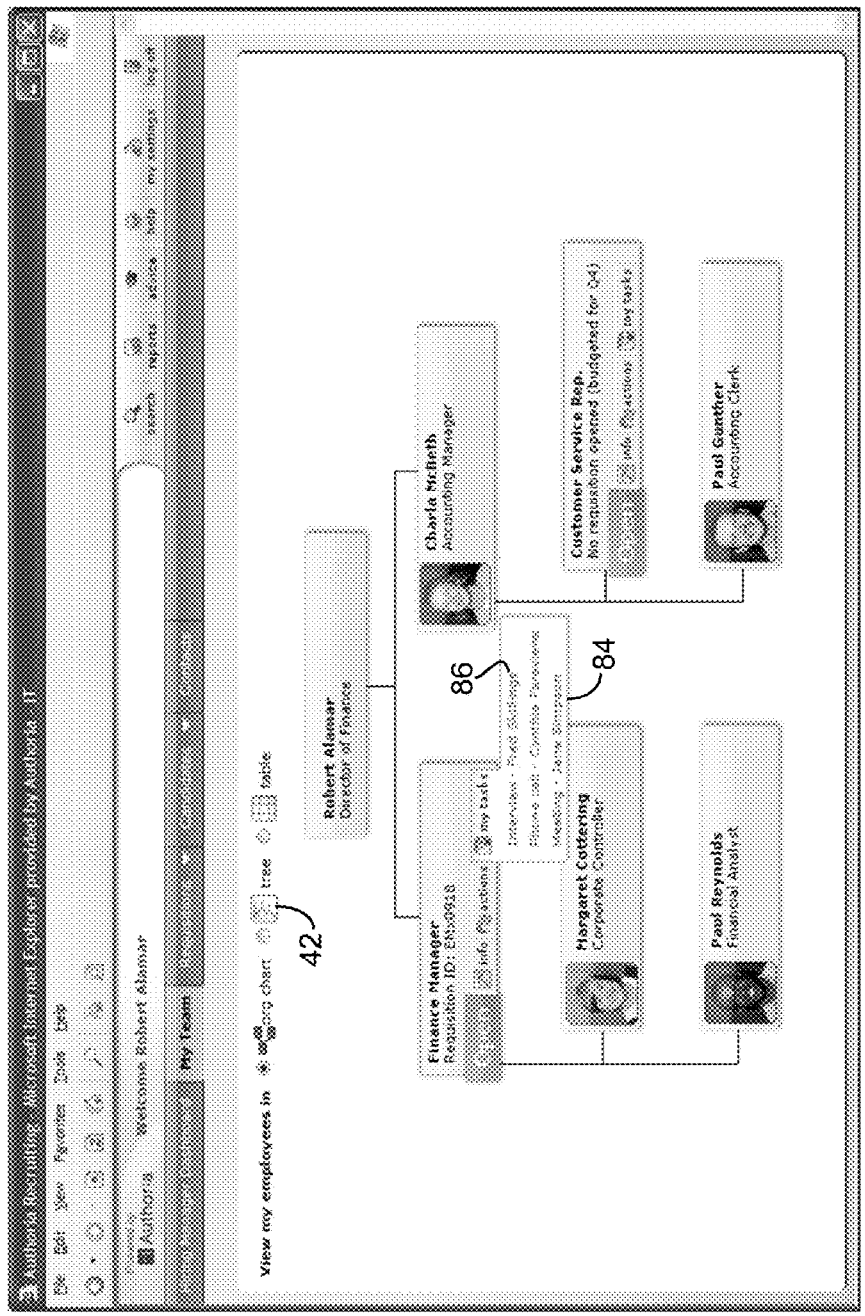
Figure 20:
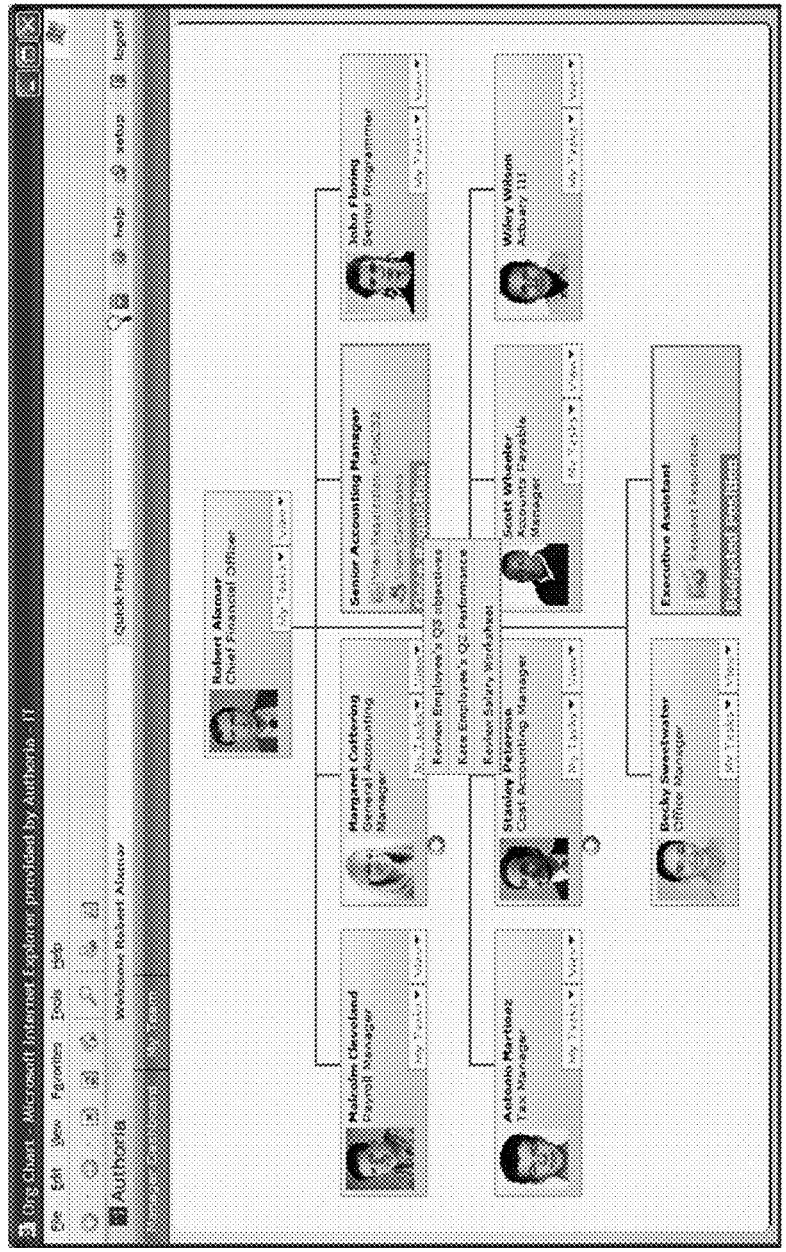

FIG. 5 shows the drop down list 84 that appears when the "my tasks" link is invoked. The list of tasks 86 is a shortened version of the task list shown in FIG. 1. When any of the items on the task list is invoked in FIG. 5, more detailed information about the task is revealed. FIG. 20 shows other examples of tasks, including tasks related to compensation and performance.

Figure 6:
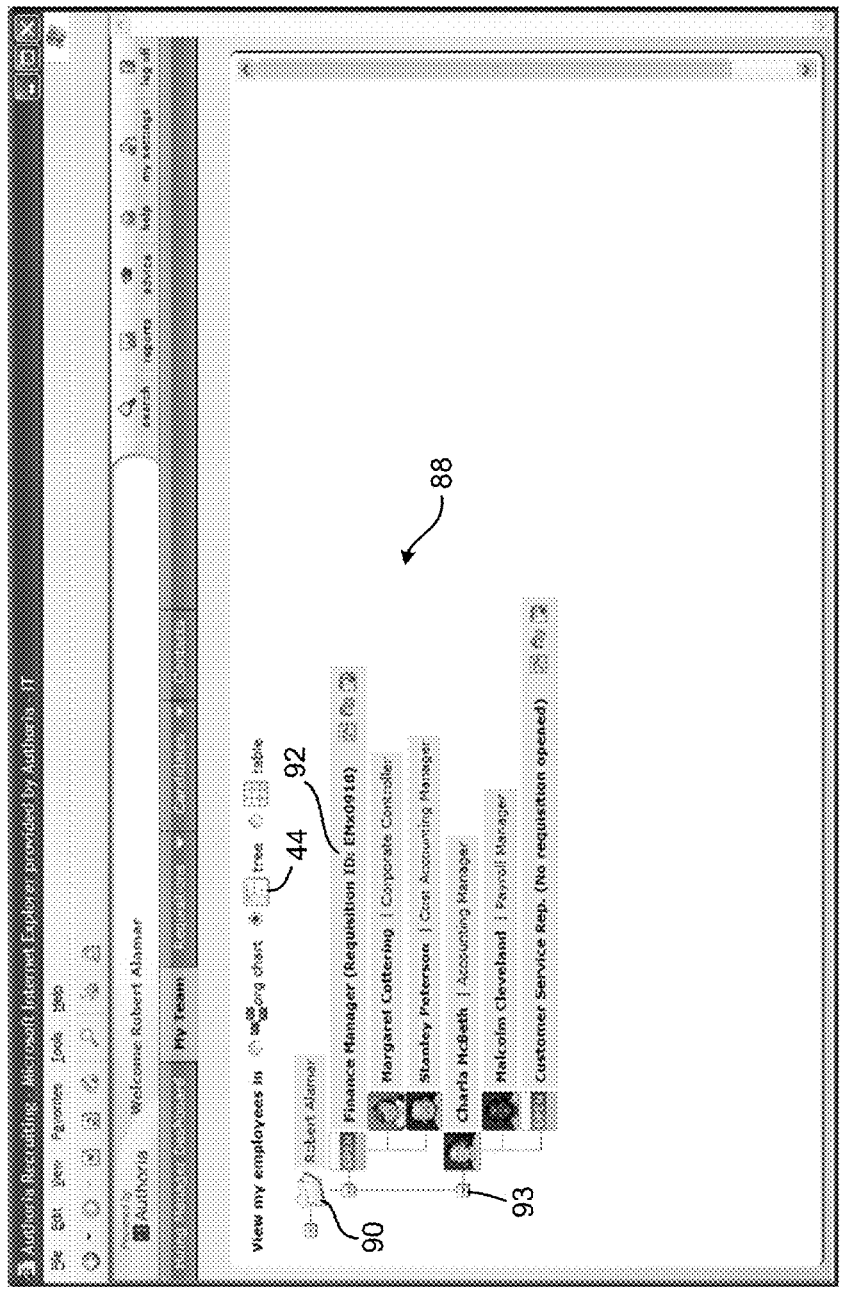

When the user invokes the tree display style 44, the information about the organizational chart is portrayed as a hierarchical list 88 as shown in FIG. 6. The root entry 90 at the top of the list represents the manager, Robert Alamar. Each position is shown in a compact panel 92 in the list. The information displayed in a panel is similar to but more compact than the information shown in a corresponding panel of FIGS. 2 through 5. For example, icons 87 correspond to the icons on earlier figures. The hierarchical levels of the list can be rolled up and rolled down by invoking + and − icons 93 in much the same way that portions of folder structures displayed by operating systems can be rolled up and rolled down.

Figure 7:
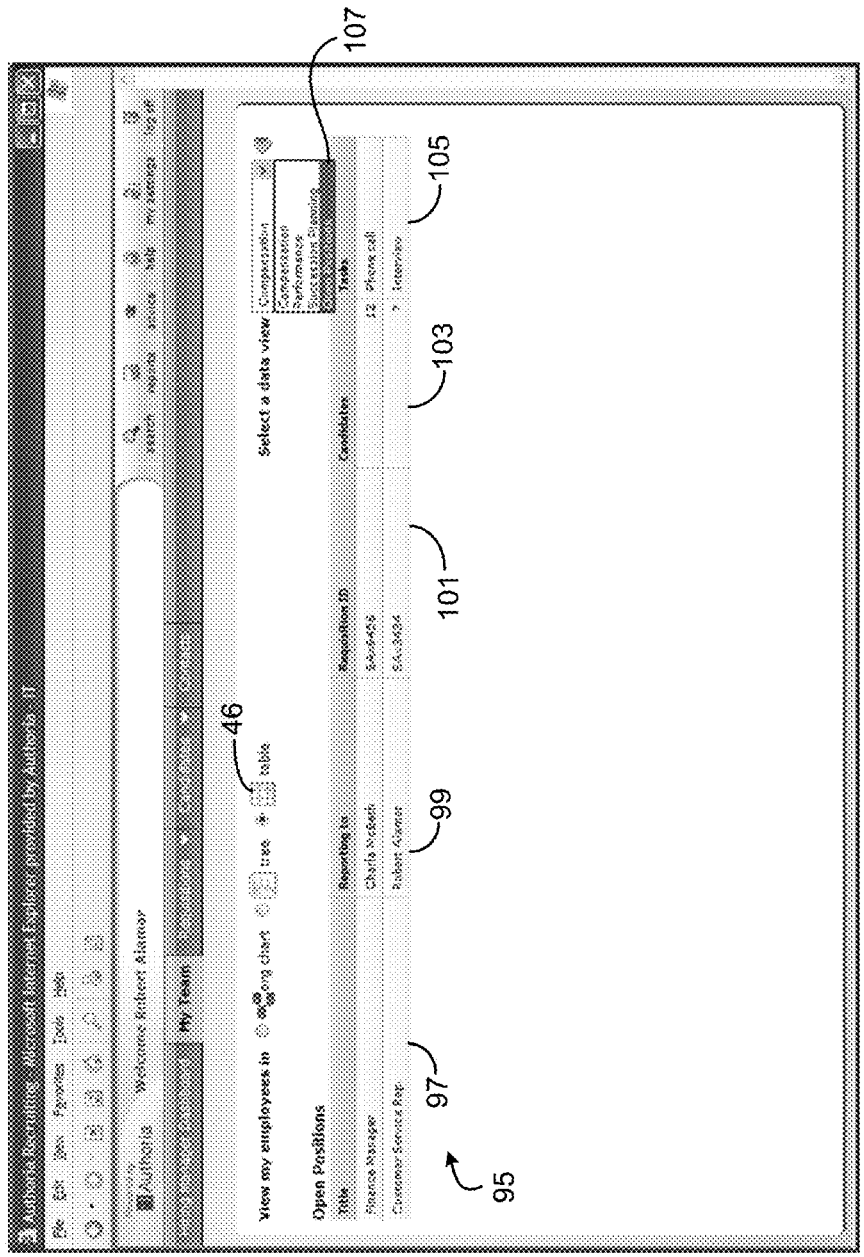

FIG. 7 shows similar information in the form of a table 95 (which is displayed when the table icon 46 is invoked) containing fields for title 97, reporting to 99, requisition ID 101, candidates 103, and tasks 105. Within the table view, the selection of which records are displayed can be determined by the manager by invoking one or another of the choices in a drop down list 94. For example, by invoking Open Positions 107, the table is limited to positions that have not been filled (as in the table shown in FIG. 7).

Some examples of an interface useful for a manager also could include features for building and managing the representation of all or a portion of an organizational structure.

Figure 8:
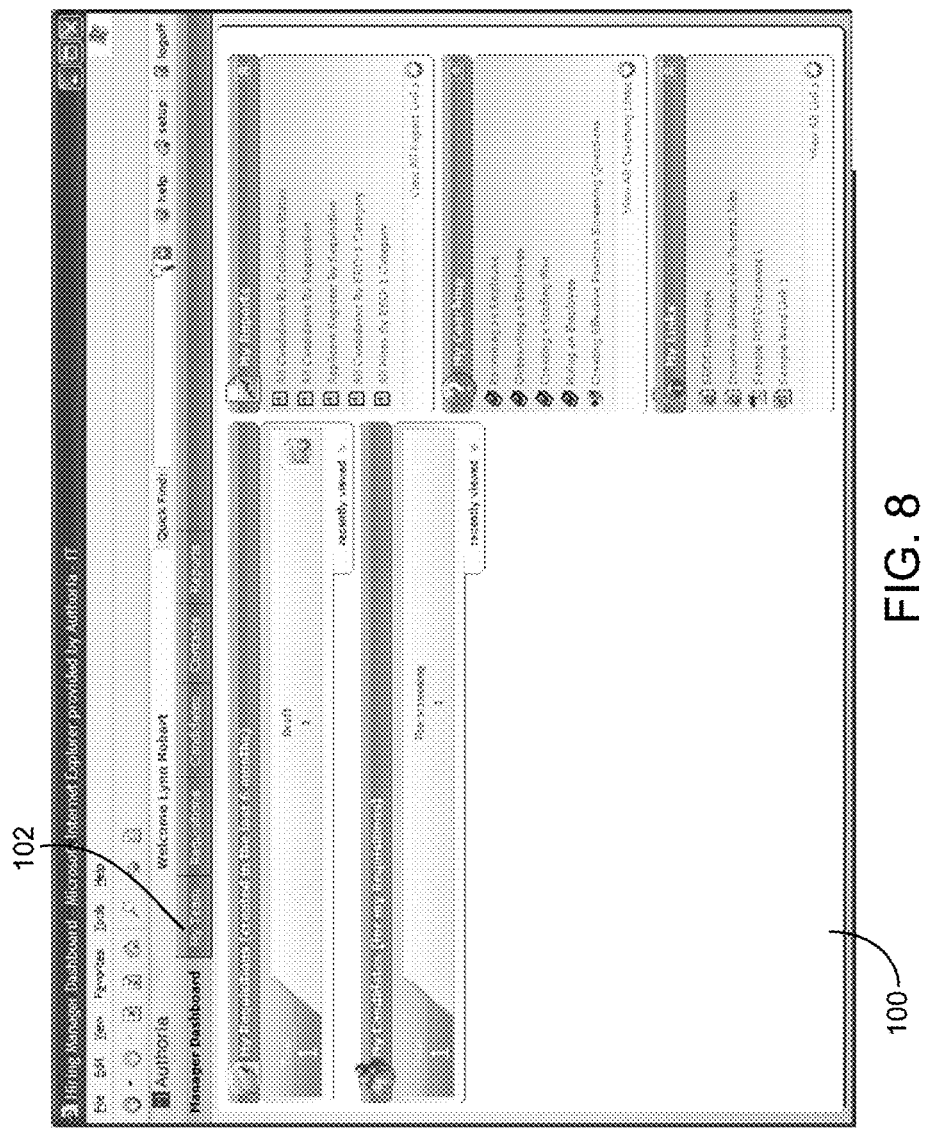

For example, as shown in FIG. 8, a portal page 100 for a CEO, Lynn Hobart, could include panes similar to the ones shown in FIG. 1. By invoking the My Team button 102, the manager is taken to the display, shown in FIG. 9, of the organizational chart 104 in which she is in the root position. (in some figures the silhouette images 115 represent specific people whose photographs are not available).

Figure 9:
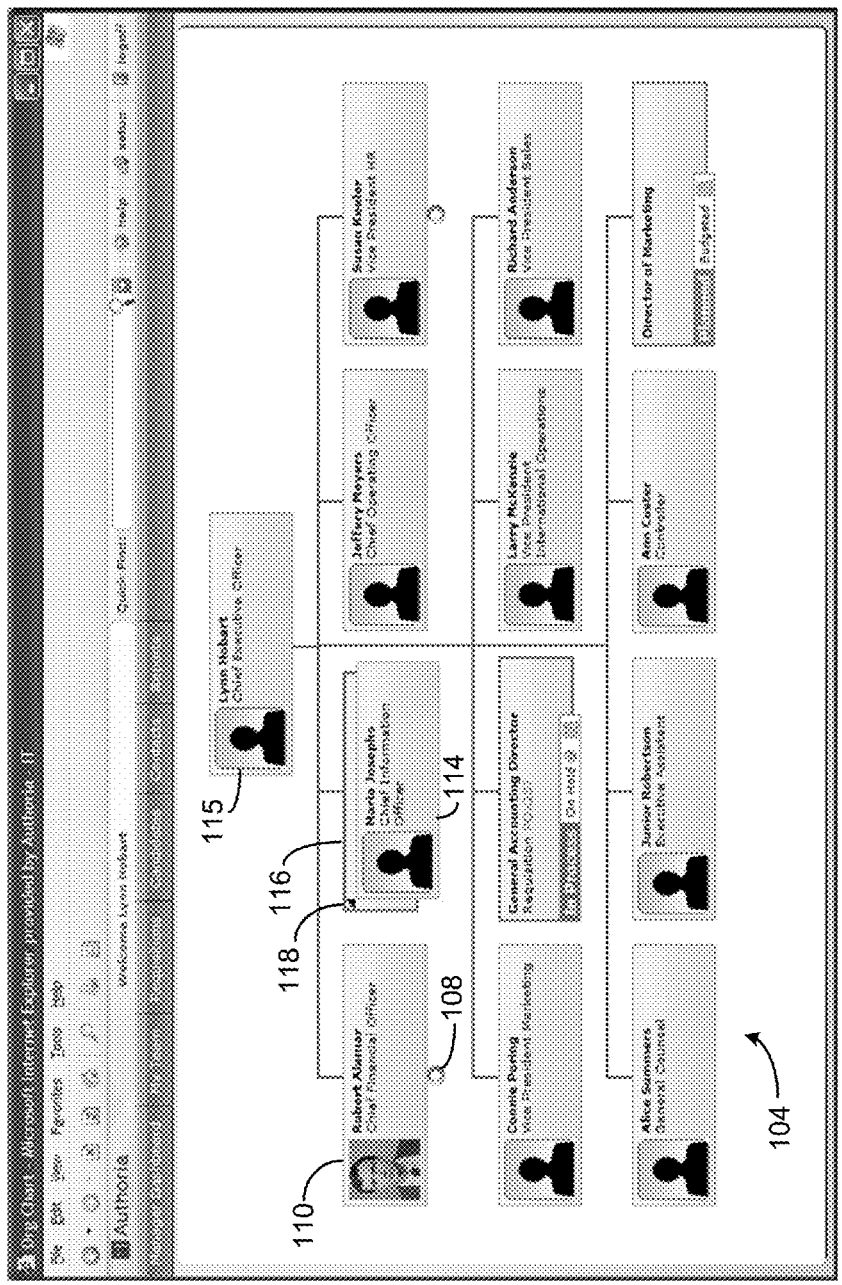

Graphical elements shown on FIG. 9 allow the manager to navigate and perform functions that help to render the organizational chart active and to serve as a user interface paradigm. For example, if the manger hovers over the down arrow icon 108 below a position panel 110, a message 111 is displayed (FIG. 10) indicating a number of additional positions that lie immediately below the position associated with the element 108. Clicking on the element 108 produces the display shown in FIG. 11 of the portion of the organizational chart that has at its top the position of FIG. 9 from which the screen of FIG. 11 was reached, and under it the positions that are under that top-level position in the organizational structure.

Figure 10:
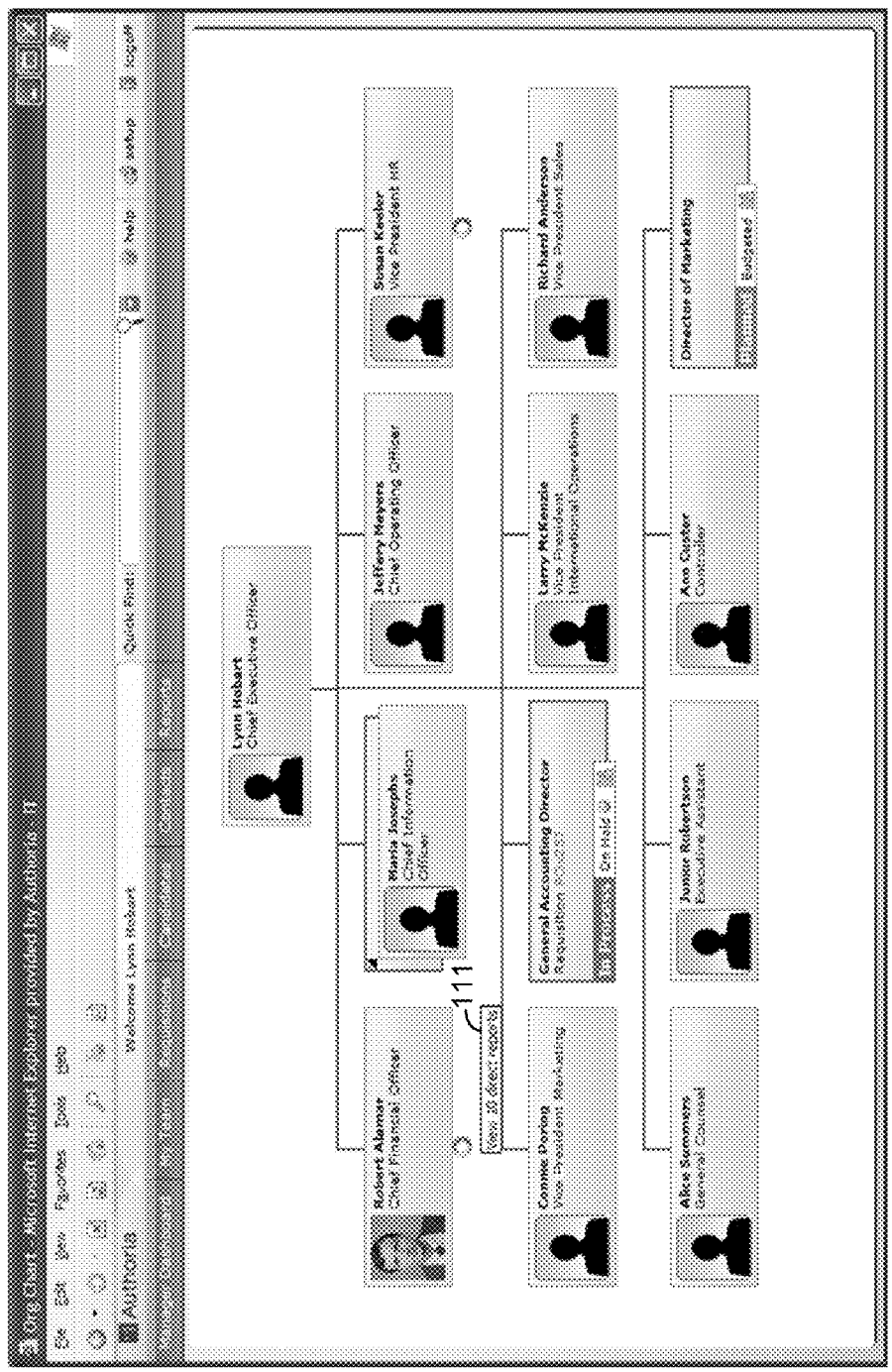
Figure 11:
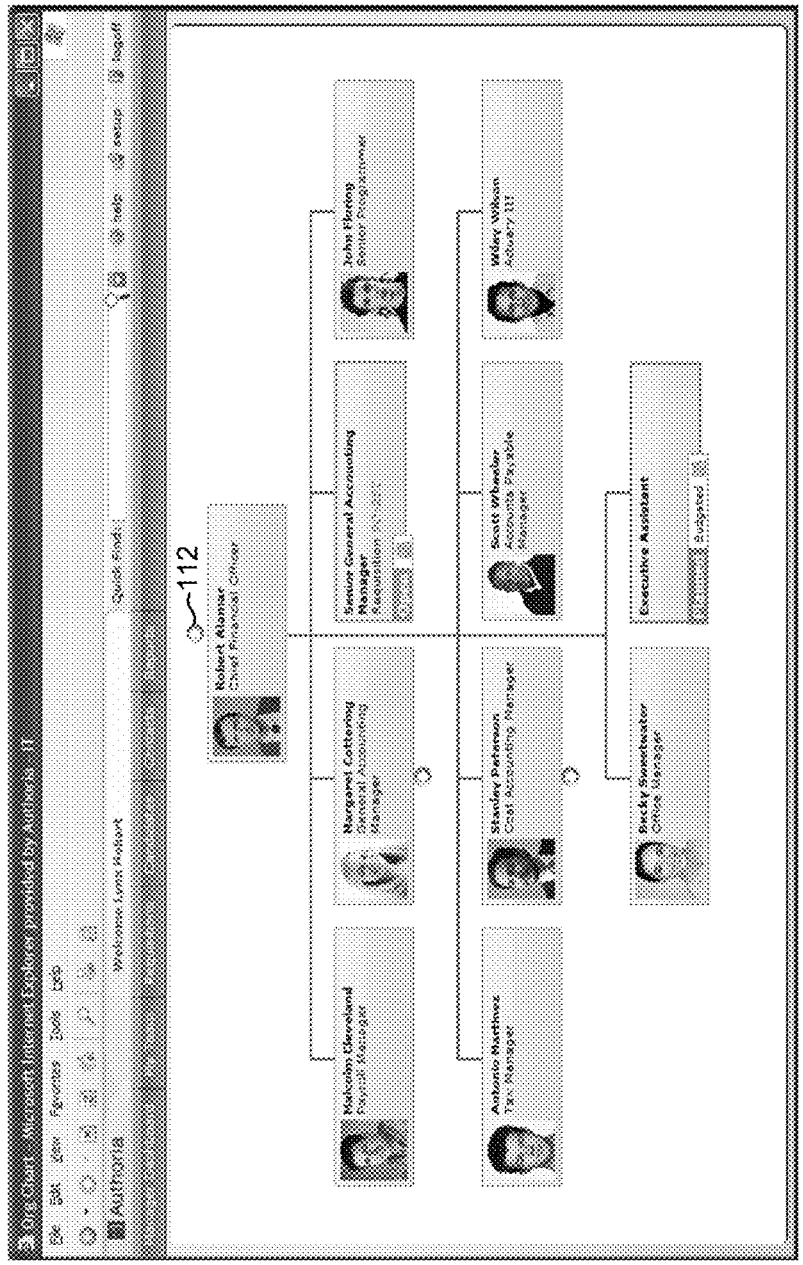

The up arrow 112 in FIG. 11 can be invoked to return to the display of FIG. 10, that is to the portion of the display that shows at its root the position above Robert Alamar, and also shows the rest of the positions under the new root position.

Figure 12:
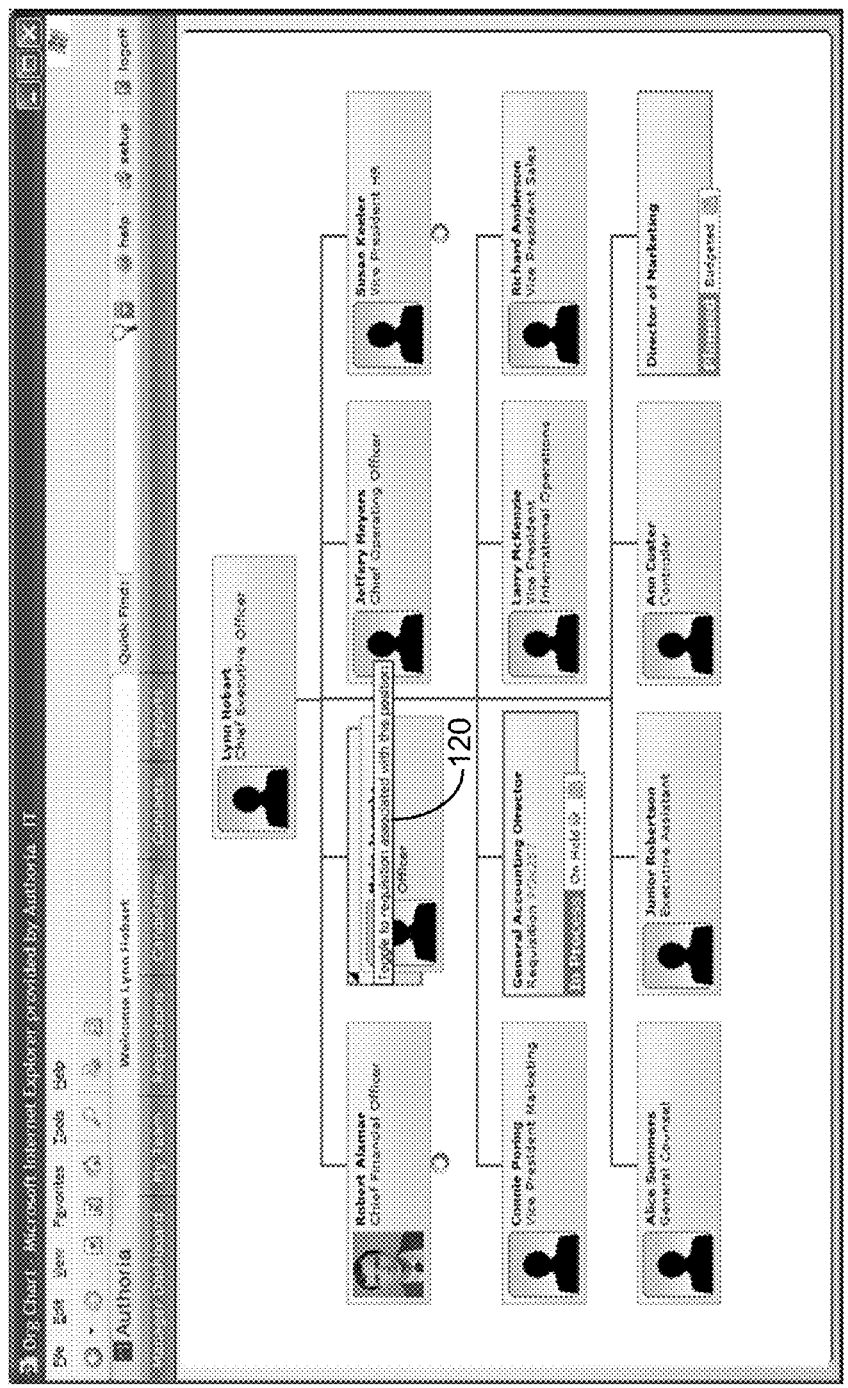
Figure 13:
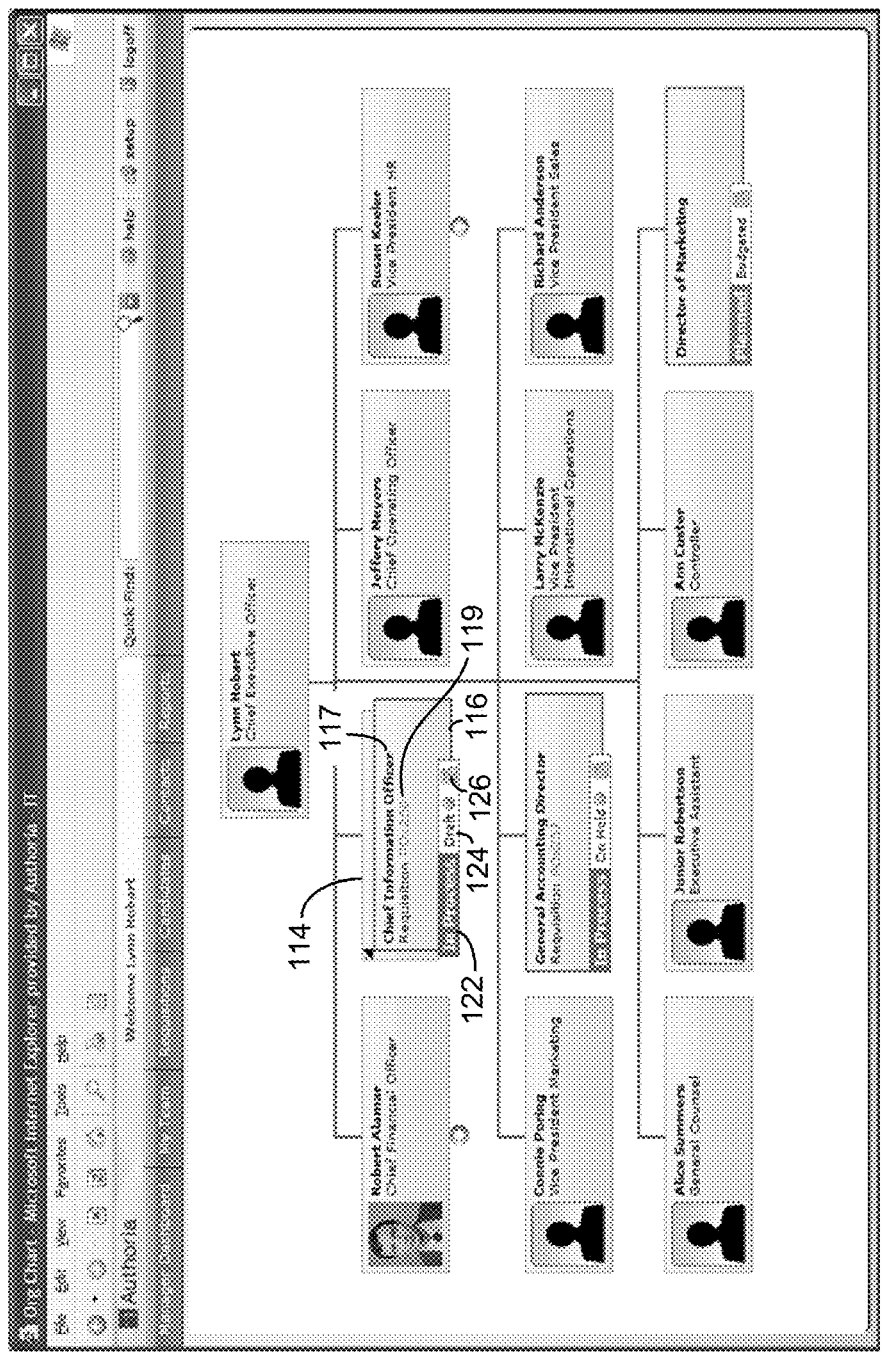
Figure 14:
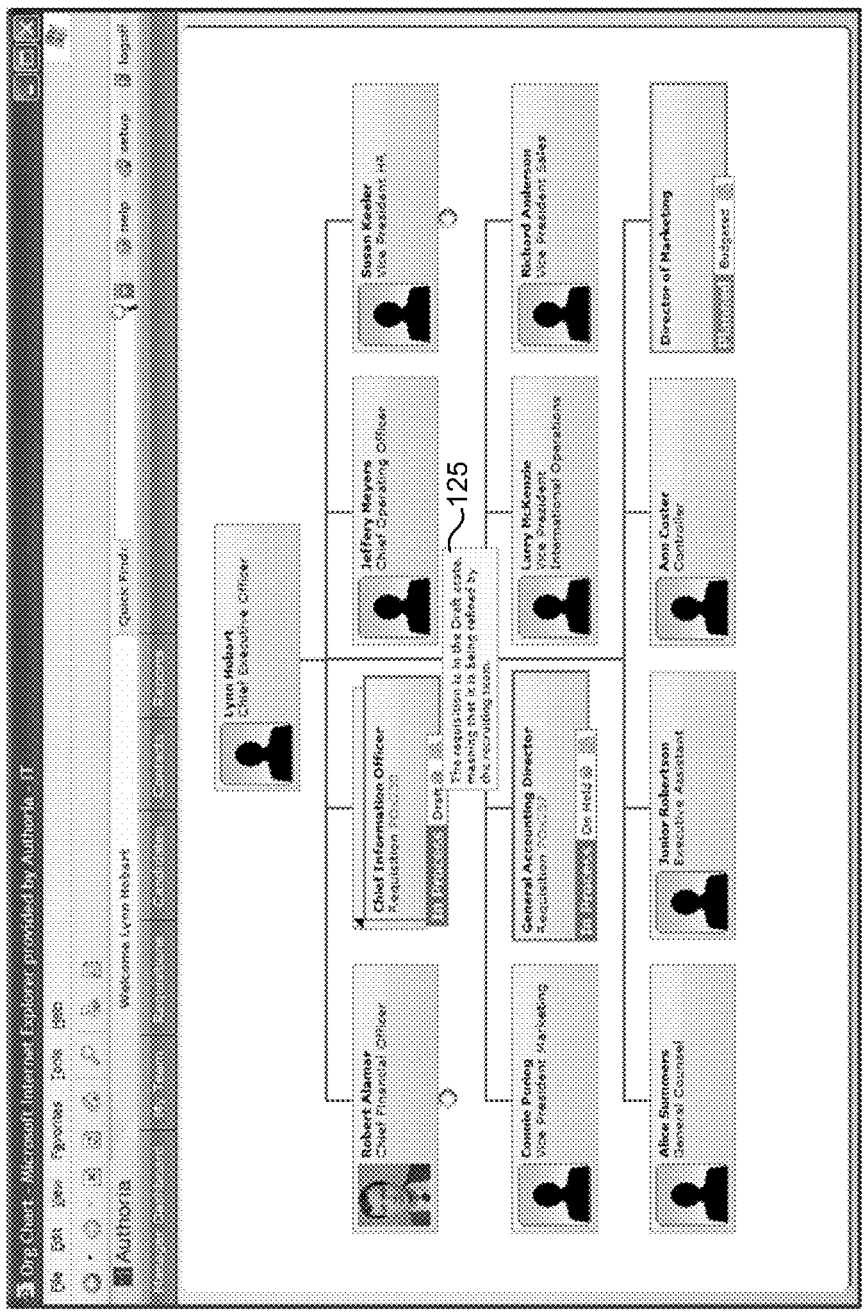
Figure 15:
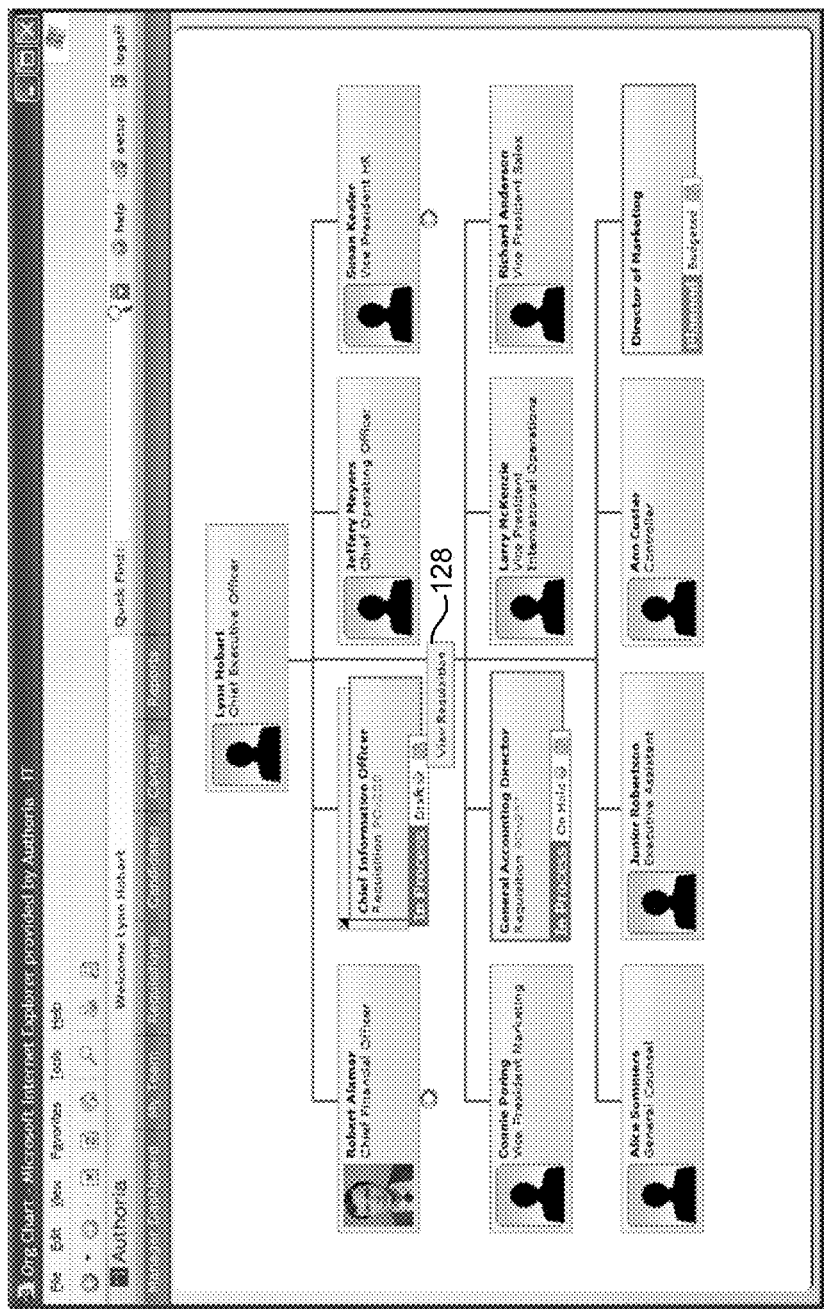

Referring again to FIG. 9, a panel that represents a position that is not currently filled can be displayed differently to enable the manager to invoke other functions associated with the status of the position. For example, the panel 114 that relates to Maria Josephs is shown with an offset underlying box 116 and a small diagonal arrow 118. As shown in FIG. 12, hovering over the arrow causes the message 120 "Toggle to requisition associated with this position" to appear. Clicking on the arrow causes the underlying box 116 to be displayed overlaying the panel 114, as shown in FIG. 13. The box 116 displays information about the position 117 and a link 119, in this example, to a requisition for the position. A tag 122 associated with the box 116 identifies the position as In Process and that a Draft of the requisition exists. The arrow 118 in FIG. 9 can be toggled to switch between the overlay of FIG. 9 and the reverse overlay of FIG. 13.

Other kinds of information and other tags could be displayed in connection with the box 116.

By clicking on the question mark icon 124 to the right of the word Draft, the manager can view a help message 125 (FIG. 14) explaining what is meant by Draft.

Returning to FIG. 13, by hovering over the clipboard icon 126 next to the question mark icon, the manager can see (FIG. 15) a message 128 indicating actions that the manager can take, in this case, viewing the requisition. By clicking on the available action description, the manager is taken to that process of the software application.

Figure 16:
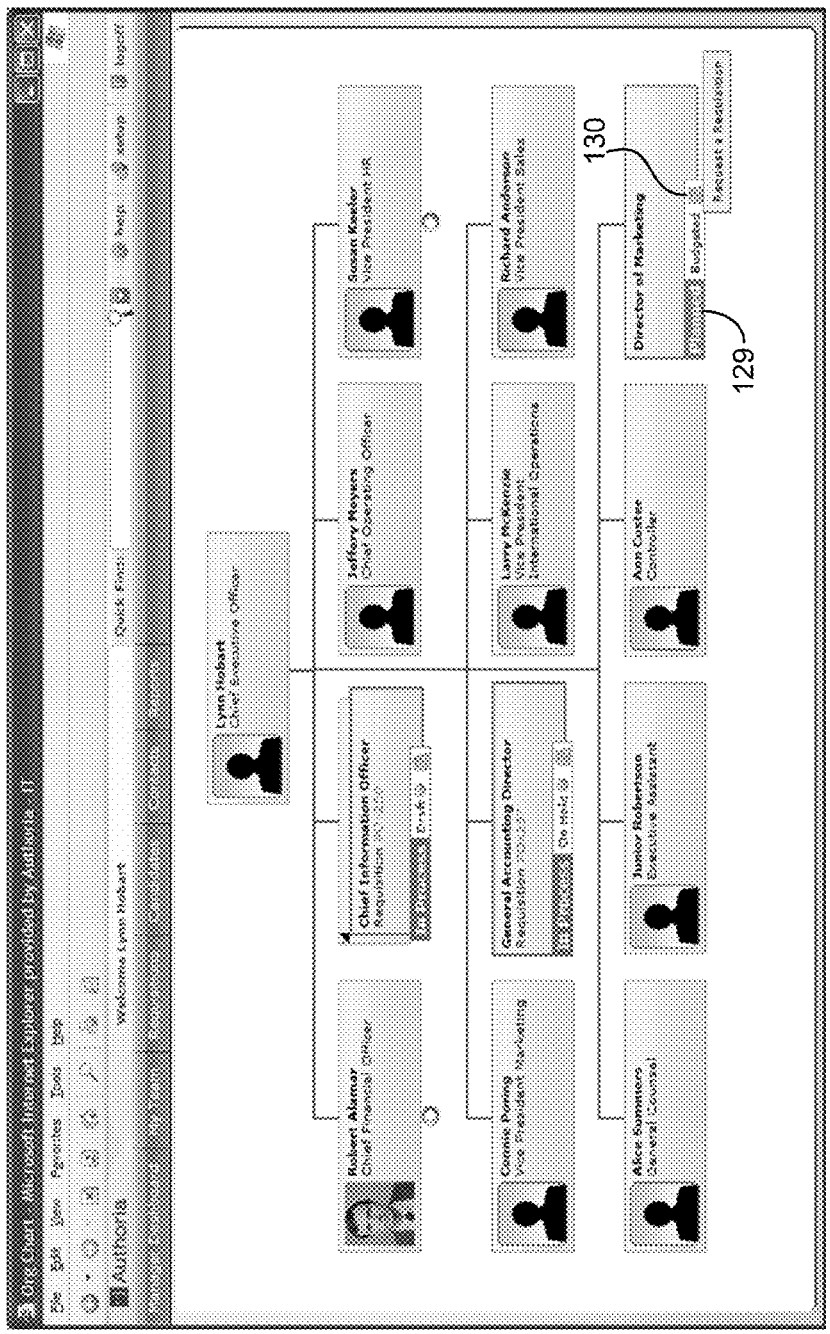
Figure 17:
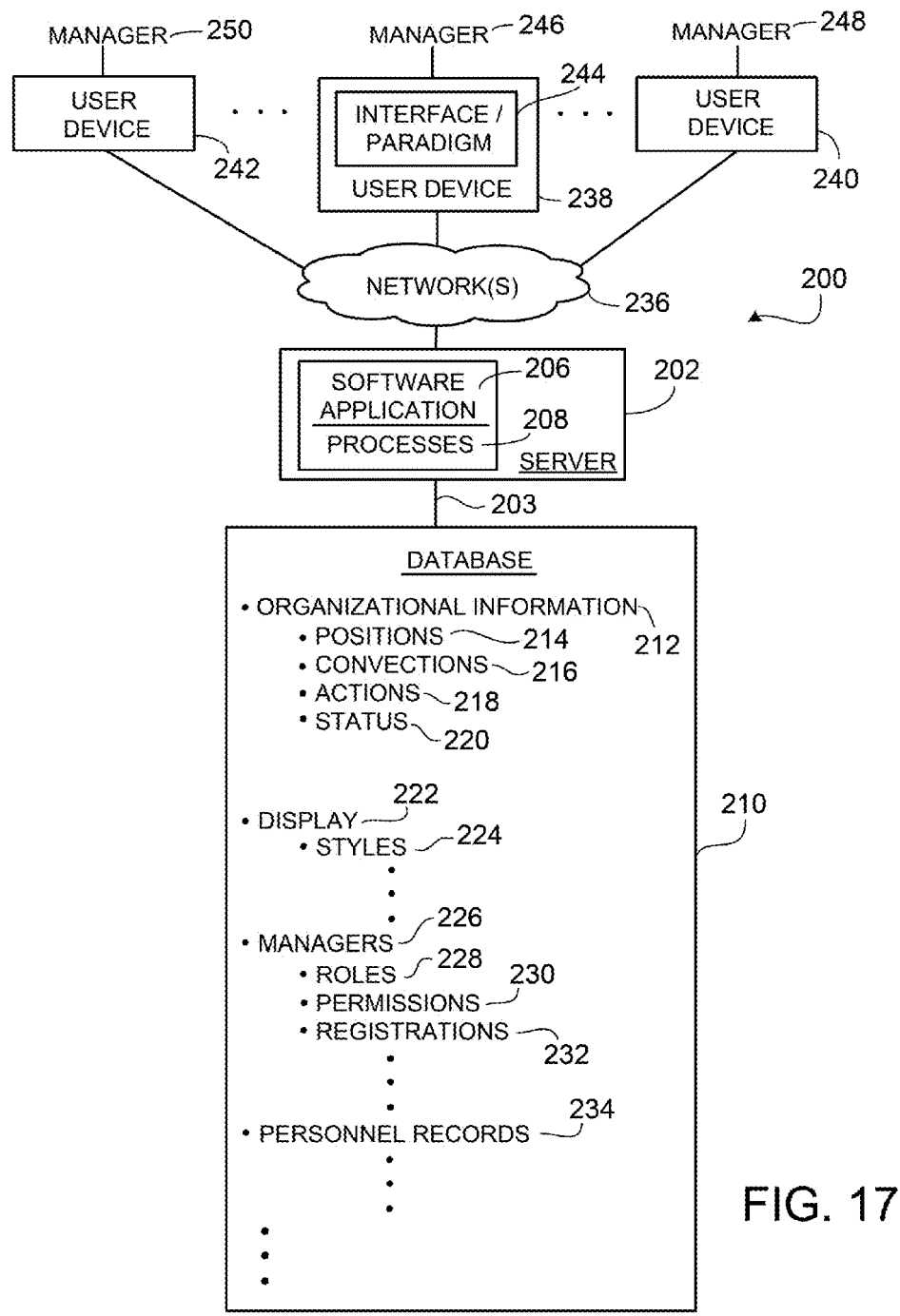

In addition to being In Process, a position can be identified as Planned 129 and Budgeted (FIG. 16). Hovering over the clipboard 130 of such a position triggers a message 132 to be displayed that enables, for example, to request a requisition in accordance with the budget.

The identities and numbers of items that can be displayed as help messages, actions, and in other ways in the panels, panes, and windows of the interface can vary and can depend on available features of the underlying software application, available information in a database, roles played by the manager, and preferences expressed by the manager.

As shown in FIG. 17, the techniques described above can be implemented using typical, generally available software, hardware, database, and communication platforms. A server (or multiple servers) 202 run a software application 206 that includes processes 208 that provide functions and information to managers useful in managing employees in an enterprise. The software application may in some implementations be run on user devices instead or on a combination of user devices and servers in a client-server mode. The software application creates, manages, and uses information in a database 210 that can be located with the server or servers, coupled to them, or located remotely and accessed by any communication link 203. The database itself may be distributed or centrally located.

The database contains, among other information, organizational information 212 that includes positions in an enterprise 214, their connections 216, actions that can be performed with respect to the positions 218, status of the positions 220; display information that can define the styles 224 of display elements, and their arrangement and presentation; information 226 about the managers who use the system including their roles 228, their permissions 230, and details about their registrations 236 to use the system; personnel records of the usual kind maintained by an enterprise 234; and other information.

The server is accessible to user devices 238, 240, 242 through one or more communication links including networks 236 such as local area networks, wide area networks, and publicly accessible networks, including the Internet. Each of the user devices presents an interface 244, for example, interfaces of the kind described above that include organizational chart paradigms. The user devices can be workstations, notebook computers, and telephones and other hand-held devices. Each of the devices can be used by one or more managers 246, 248, 250.

Other implementations are also within the scope of the claims.

For example, the manager may be permitted to access and work with portions or all of organizational charts for positions and people that he does not manage. For instance, a human resources manager may have permission to see and take actions with respect to any part of the organizational chart of an enterprise.

The invention claimed is:

1. A method comprising:
receiving, from a server by an electronic device of a manager of a portion of an enterprise, data representing a part of an organizational chart of the enterprise, the part of the organizational chart representing employee positions associated with the manager of the portion of the enterprise, the electronic device including a processor, based on the received data, displaying, through an interactive user interface of the electronic device, to the manager, a portion of the organizational chart of the enterprise that includes graphical elements representing employee positions associated with the manager, relationships among those employee positions, and, for each employee position, a status of the employee position, displaying a control element with a particular graphical element that can be invoked by the manager to change a status of a particular employee position, receiving a selection of the control element that indicates a change in the status of the particular employee position to open or filled, and in response to the receipt of the selection, changing the display of the particular graphical element that represents the particular employee position.

2. The method of claim 1 in which the status of each employee position includes open, evaluation pending, interview pending, offer pending, or filled.

3. The method of claim 1 in which the status of each employee position includes planned, budgeted, or filled.

4. The method of claim 1 in which each of the employee positions included in the portion of the organizational chart are positions that are not filled and the status of the respective position includes evaluation pending, interview pending, or offer pending.

5. The method of claim 4 comprising:
receiving input from the manager indicating a change to the status of one of the employee positions; and
updating the graphical element that corresponds with the one of the employee positions based on the change to the status of the one of the employee positions.

6. The method of claim 5 in which updating the graphical element comprises updating at least one of a name, a title, or a photograph of an employee for the one of the employee positions.

7. The method of claim 1 in which, for each of the employee positions, a color of the graphical element of the corresponding employee position represents the status of the corresponding employee position.

8. The method of claim 1 comprising:
displaying a control element that can be invoked to filter the employee positions by the status of the employee positions;
receiving a selection of a particular status in the control element; and
displaying, in the portion of the organizational chart, only the employee positions that have the particular status.

9. The method of claim 1 comprising:
displaying information about a group of employee positions in the portion of the organizational chart.

10. The method of claim 9 in which each of the employee positions in the group of employee position has the same status.

11. The method of claim 1 in which a root node of the portion of the organizational chart comprises the manager's position.

12. The method of claim 1 in which the electronic device comprises a hand-held device.

13. The method of claim 12 comprising:
storing the data representing the part of the organizational chart in a memory local to the hand-held device, and
retrieving data representing the portion of the organizational chart from the memory local to the hand-held device,
the portion of the organizational chart of the enterprise being displayed in response to retrieving the data representing the portion of the organizational chart from the memory local to the hand-held device.

14. The method of claim 12 comprising:
receiving, by the hand-held device, instructions for the generation of the portion of the organizational chart from the server.

15. A method comprising
receiving, from a server by an electronic device of a manager of a portion of an enterprise, data representing a part of an organizational chart of the enterprise, the part of the organizational chart representing employee positions associated with the manager of the portion of the enterprise, the electronic device including a processor,
based on the received data, displaying, through an interactive user interface of the electronic device, to the manager, a portion of the organizational chart of the enterprise that includes graphical elements representing employee positions associated with the manager, relationships among those employee positions, and, for each employee position, a status of the employee position, and
displaying a control element that can be invoked by the manager to filter the employee positions by the status of the employee position.

16. The method of claim 15 comprising:
receiving a selection of a particular status in the control element, and
displaying, in the portion of the organizational chart, only the employee positions that have the particular status.

17. The method of claim 15 in which the status of each employee position includes open, evaluation pending, interview pending, offer pending, or filled.

18. The method of claim 15 comprising:
receiving input from the manager indicating a change to the status of one of the employee positions, and
updating the graphical element that corresponds with the one of the employee positions based on the change to the status of the one of the employee positions.

19. The method of claim 18 in which updating the graphical element comprises updating at least one of a name, a title, or a photograph of an employee for the one of the employee positions.

20. The method of claim 15 comprising:
displaying information about a group of employee positions in the portion of the organizational chart.

21. The method of claim 20 in which each of the employee positions in the group of employee position has the same status.

22. The method of claim 15 in which a root node of the portion of the organizational chart is the manager's position.

23. A method comprising:
receiving, from a server by an electronic device of a manager of a portion of an enterprise, data representing a part of an organizational chart of the enterprise, the part of the organizational chart representing employee positions associated with the manager of the portion of the enterprise, the electronic device including a processor,
based on the received data, displaying, through an interactive user interface of the electronic device, to the manager, a portion of the organizational chart of the enterprise that includes graphical elements representing employee positions associated with the manager and relationships among those employee positions, and
displaying, for at least one of the employee positions, a control element that indicates a number of additional employee positions, not included in the portion of the organizational chart, that lie below the corresponding employee position.

24. The method of claim 23 comprising:
receiving selection of one of the control elements for a particular employee position, and
displaying another portion of the organizational chart that includes other graphical elements representing the additional employee positions that lie below the particular employee position.

25. The method of claim 24 in which the graphical element for the particular employee position comprises a root node of the other portion of the organizational chart.

26. The method of claim 24 wherein displaying the other portion of the organizational chart comprises removing the portion of the organizational chart from the user interface, the method comprising:
displaying another control element that can be invoked to present the portion of the organizational chart,
receiving indication of a selection of the other control element,
displaying the portion of the organizational chart in the user interface, and
removing the other portion of the organizational chart from the user interface.

27. The method of claim 23 comprising:
receiving an indication of a mouse hovering over the control element of a particular employee position, and
displaying the number of additional employee positions that lie below the particular employee position in response to the receipt of the indication of the mouse hovering over the control element.

28. The method of claim 23 in which each of the graphical elements represents a group of employee positions.

29. The method of claim 28 in which each of the employee positions in the group of employee positions has at least one common attribute.

30. The method of claim 29 in which the common attribute includes a status of the employee position.

31. The method of claim 23 in which the portion of the organizational chart is determined based on a current role of the manager.

32. A method comprising:
receiving, from a server by an electronic device of a manager of a portion of an enterprise, data representing a part of an organizational chart of the enterprise, the part of the organizational chart representing employee positions associated with the manager of the portion of the enterprise, the electronic device including a processor,
based on the received data, displaying, through an interactive user interface of the electronic device, to the manager, a portion of the organizational chart of the enterprise that includes graphical elements representing employee positions associated with the manager and relationships among those employee positions, and
displaying, for at least one of the employee positions, a control element that can be invoked to add a new employee position to the portion of the organizational chart.

33. The method of claim 32 comprising:
receiving an indication of a selection of the control element,
displaying a window in the user interface that allows the manager to enter information about the new employee position, and
automatically displaying the portion of the organizational chart with a new graphical element for the new employee position upon determining that the manager has completed the entry of information about the new employee position.

34. The method of claim 32 in which the control element is for a specific employee position, the method comprising:
adding a new graphical element for a new employee position below the specific employee position upon receipt of an indication of a selection of the control element.

35. The method of claim 32 in which a status of the new employee position includes vacant, evaluation pending, interview pending, offer pending, or filled.

36. The method of claim 35 comprising:
receiving a selection of another control element that indicates change to the status of the new employee position.

37. The method of claim 32 in which the portion of the organizational chart is determined based on a current role of the manager.

38. A method comprising:
receiving, from a server by an electronic device of a manager of a portion of an enterprise, data representing a part of an organizational chart of the enterprise, the part of the organizational chart representing employee positions associated with the manager of the portion of the enterprise, the electronic device including a processor,
based on the received data, displaying, through an interactive user interface of the electronic device, to the manager of, a portion of the organizational chart of the enterprise that includes graphical elements representing employee positions associated with the manager and relationships among those employee positions, and
displaying, for at least one of the employee positions, a list of tasks associated with the corresponding employee position.

39. The method of claim 38 in which the tasks include hiring tasks.

40. The method of claim 38 in which the tasks include tasks assigned to the manager.

41. The method of claim 38 comprising:
receiving an indication of a selection of one of the tasks, and
performing an action for the selected task.

42. The method of claim 41 in which the action comprises displaying more detailed information about the selected task.

43. A method comprising:
receiving, by an electronic device from a server, data representing a part of an organizational chart of an enterprise, the part of the organizational chart representing employee positions associated with a manager of a portion of the enterprise, the electronic device including a processor,
storing, by the electronic device, the data representing the part of the organizational chart in a memory local to the electronic device in response to receiving the data,
retrieving, by the electronic device, data representing a portion of the organizational chart from the memory,
displaying, by the electronic device through an interactive user interface of the electronic device in response to retrieving data representing the portion of the organizational chart from the memory, to the manager, the portion of the organizational chart of the enterprise that includes graphical elements representing employee positions associated with the manager, relationships among those employee positions, and, for each employee position, a status of the employee position,
displaying, by the electronic device, a status control element that can be invoked by the manager to filter the employee positions by the status of the employee position,
receiving, by the electronic device, a selection of a particular status in the status control element,
determining, by the electronic device, the employee positions that have the particular status using the data representing the portion of the organizational chart stored in the memory in response to receiving the selection of the particular status in the status control element,
displaying, by the electronic device in the portion of the organizational chart, only the employee positions that have the particular status in response to determining the employee positions that have the particular status,
displaying, by the electronic device for at least one of the employee positions, a control element that indicates a number of additional employee positions, not included in the portion of the organizational chart, that lie below the corresponding employee position, receiving, by the electronic device, selection of one of the control elements for a particular employee position, determining, by the electronic device using the data representing the part of the organizational chart stored in the memory, another portion of the organizational chart, displaying, by the electronic device, the other portion of the organizational chart that includes other graphical elements representing the additional employee positions that lie below the particular employee position in response to determining the other portion of the organizational chart, displaying, by the electronic device for at least one of the employee positions, a new employee position control element that can be invoked to add a new employee position to the portion of the organizational chart, receiving, by the electronic device, an indication of a selection of the new employee position control element, displaying, by the electronic device, a window in the user interface that allows the manager to enter information about the new employee position in response to receiving the indication of the selection of the new employee position control element, storing, by the electronic device in the memory, the information about the new employee position upon determining that the manager has completed the entry of information about the new employee position, automatically displaying, by the electronic device, the portion of the organizational chart with a new graphical element for the new employee position upon determining that the manager has completed the entry of information about the new employee position, retrieving, by the electronic device for at least one of the employee positions, a list of tasks associated with the corresponding employee position from the memory, displaying, by the electronic device for the at least one of the employee positions, the list of tasks associated with the corresponding employee position, receiving, by the electronic device, an indication of a selection of one of the tasks, and performing, by the electronic device, an action for the selected task.

44. The method of claim 43 comprising:

maintaining, in a common centrally stored database at the server that includes a processor and a memory, human resource information about different groups of employees of an enterprise to enable two or more managers of the enterprise through electronic devices to perform management functions with respect to the different groups of employees for whom the managers are respectively responsible, the human resources information including information useful for performance of management functions by managers with respect to employees who have reporting relationships to the managers, retrieving, by the server and for each of the electronic devices of the two or more managers, particular information from the centrally stored database of human resource information and for use in displaying portions of organizational charts and controls associated with the organizational chart in interactive user interfaces on the electronic devices, providing, by the server to each of the electronic devices of the two or more managers using electronic communication with the respective electronic device, the particular information useful to each of the respective managers in performance of management functions with respect to the employees who have a reporting relationship to each of the respective managers, and receiving, by the server and from each of the electronic devices, requests for information associated with the employees who have the reporting relationships to each of the respective managers and information representing actions taken by the respective managers with respect to the employees through the controls of the interactive user interfaces of the managers' respective electronic devices, the actions including at least one of filtering employee positions by status of the employee position, expanding and contracting the portion of the organizational chart displayed, and adding a new employee position to the portion of the organizational chart, the maintaining of the common centrally stored database at the server taking account of the actions taken by the respective managers.

* * * * *